United States Patent [19]

Tauszig

[11] 4,021,605

[45] May 3, 1977

[54] ELECTRONIC CIRCUIT FOR ELECTRONIC STENCIL CUTTER

[75] Inventor: Julio G. Tauszig, San Isidro, Argentina

[73] Assignee: A. B. Dick Company, Chicago, Ill.

[22] Filed: Sept. 12, 1975

[21] Appl. No.: 612,638

[30] Foreign Application Priority Data

Sept. 23, 1974 Argentina .......................... 255693

[52] U.S. Cl. ................................ 358/297; 346/163

[51] Int. Cl.² .......................................... H04N 1/00

[58] Field of Search ..................... 178/6.6 B, 6.6 R; 346/74 SB

[56] References Cited

UNITED STATES PATENTS

| | | | |
|---|---|---|---|
| 3,801,738 | 4/1974 | Egerton | 178/6.6 B |
| 3,952,144 | 4/1976 | Kolker | 178/6.6 R |

*Primary Examiner*—Thomas B. Habecker
*Attorney, Agent, or Firm*—Peter S. Lucyshyn

[57] ABSTRACT

Stencil cutting apparatus for electrically burning information from an original document into a stencil material having non-linear burning characteristics by the application of electrical pulses to a stylus contacting the stencil material positioned on a rotatable cylinder, includes a photomultiplier for scanning the original document and providing an output signal the amplitude of which is proportional to the light reflected by the information thereon, a circuit including a square wave oscillator and wave shaping network which alters the square wave in relation to the burning characteristics of the stencil material to produce a resultant train of pulses and a comparator circuit which adds the photomultiplier signal and train of pulses. The comparator provides output pulses having a width determined by the addition of the last-mentioned signal and pulses which are fed to the stylus for burning the stencil. The cylinder upon which the stencil material is mounted includes a magnet which revolves as the cylinder rotates. The movement of the magnet past a sensing coil produces a signal to discontinue the burning as the stylus passes over the stencil clamp of the cylinder.

10 Claims, 11 Drawing Figures

ELECTRONIC CIRCUIT FOR ELECTRONIC STENCIL CUTTER

BACKGROUND OF THE INVENTION

The present invention relates to apparatus for engraving stencils in general, and more particularly it refers to an electronic circuit for electronic engraving or stencil cutting machines.

SUMMARY OF THE INVENTION

The main object of the present invention is to optimize the reproduction of stencils so as to obtain many copies from a given original.

Another object of the present invention is the designing of an electronic circuit for engraving devices of the specified type which burn information from an original into stencil material having non-linear burning characteristics, by means of which there is reached a high fidelity in the reproduction of the multiple copies obtained from the stencils engraved through the operation of said circuit.

Another object of the present invention, attained by means of the electronic circuit which is going to be described, is to obtain rectangular impulse trains the width of which is a function of the video voltage, with a variable ratio between impulse length and video voltage, depending on the shape of the exponential wave applied from a wave shaper. The pulse train is amplified and fed into two high speed differential comparators into which there are also injected waves whose shape is determined by the various light and dark tones of the original to be reproduced.

The above, and other objects among which there are various systems of protection against overload, based on the variations to which various parameters such as overheating of the junctions, excess voltage and excess current may be subjected, will be seen in more detail below.

There are known stencil engraving electronic devices which work with impulse signals obtained from photomultipliers which are directly proportional to the intensity of the graphic structure or of the original, in which the output of the photomultiplier is applied to a generator which produces through a stylus a discharge of sparks to reproduce the image of the original. These devices often suffer from drawbacks, such as the variations in speed of the drum with respect to the activity of the engraving wire or stylus or also from the starting period of the engraving or cutting, and the rise or descent of said wire away from or toward the stencil material to execute its work.

Those and other drawbacks which limit the fidelity of the copies reproduced have been solved through the application of the present invention in which there is supplied an appreciable regulation of the tones and an exact correspondence with the original, reproducing the latter with full precision and detail at a speed which is at least twice that of the highest speed known until now.

In the form of execution which is to be described, there is basically the photomultiplying or optical sensor element with its corresponding high voltage feeding source which associated with the main source and the secondary one energizes all of the circuit, which photomultiplier is connected with an amplifier the output of which is supplied to a pair of high velocity differential comparators which also receive trains of waves the impulses of which are defined by a wave shaper. The circuit includes an oscillator and a power amplifier which feeds the engraving wire, all of which will be seen below.

DESCRIPTION OF THE DRAWING

In order for the present invention to be easily understood and to be executed without difficulties, there shall be given below a precise description of a preferred form of execution, with reference to the attached drawing, given as a purely illustrative and nonlimitative example of the invention, in which.

DETAILED DESCRIPTION OF THE DRAWING

In the figures, the same reference indications refer to equal or to corresponding parts.

In essence, and in the particular case which is illustrated, there is held between elements the photomultiplying tube 1, the signal of which is amplified by an integrated circuit 2, and is applied to the inputs 3, 4 of two differential comparators, of high velocity. At the other inputs of those comparators, designated by 5, and 6, there are applied impulses of a given shape, with a 180° phase difference between them. The shape of the wave is determined in a manner such that the various tones of the original are reproduced with the greatest fidelity in the copy.

Figure 3A:
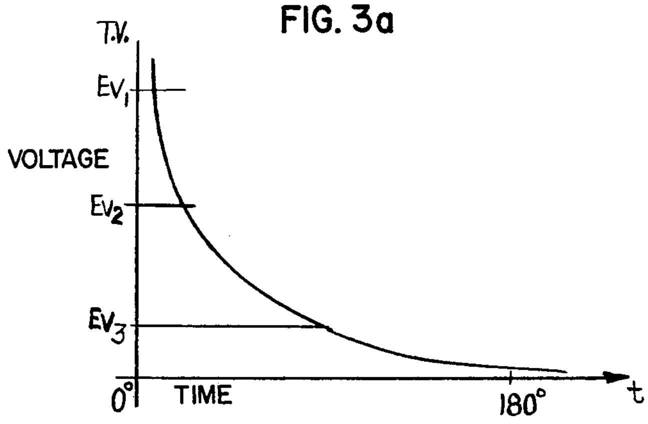
FIG. 3*a* is a representation of the shape of the curve coming from the wave shaper prepared so that the system has little gain in the light tones and much more in the dark tones, and FIGS. 3*b, c* and *d* are representations of output impulses resulting from a comparison made by the electrical circuit according to the invention of the wave form of FIG. 3*a* and the output signal of the photomultiplier tube scanning information on an original document to be reproduced.

As it is well known, in order to achieve high fidelity, the system must have little gain in the light tones, and a much greater gain in the dark tones, so that the resulting curve will present the approximate shape indicated in FIG. 3*a*. The amplitude of the output signal from the photomultiplier tube 1 varies proportionally to the light reflected from the light, dark and intermediate range tones of the information on the original document being reproduced. The shape of the train of pulses applied to inputs 5 and 6 of the comparators 45, 47, respectively, varies in accordance with the non-linear characteristics of the stencil in which the information on the original document being reproduced is burned.

The photomultipler output and the train of pulses provided are combined (added) in the comparators to produce a signal which is applied to the stylus wire for burning the stencil.

Figure 3B:
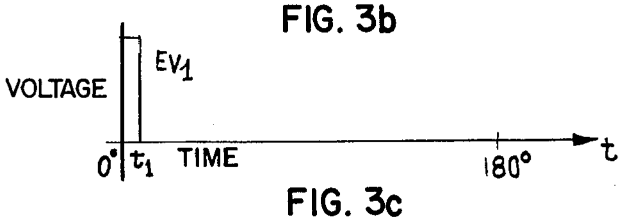
Figure 3C:
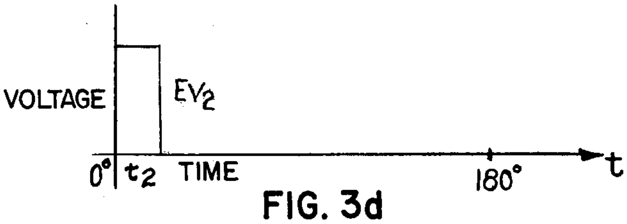
Figure 3D:
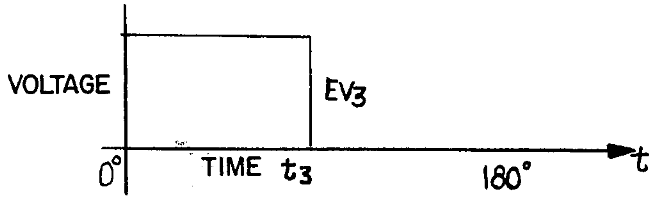

As a result, at the output of each comparator there will be obtained an impulse rectangular in shape, the width of which will vary depending on the video voltage, and with a ratio, impulse length/video voltage, variable according to FIG. 3*a*. The output of the comparators in fact represent the intervals of time $t$ when the amplitude of the output signal provided by the photomultiplier tube scanning the information on the original document is greater than the amplitude of the non-linearly varying curve of FIG. 3*a*. These outputs are represented in FIGS. 3*b*, *c*, and *d* wherein the resulting widths of the output of a comparator is illustrated by rectangular waves of widths of $t_1$, $t_2$ and $t_3$, respectively. The curves 3*b*, *c* and *d* are illustrative of output signals representing information which is light, medium and dark in tone or shade, respectively.

Figure 4A:
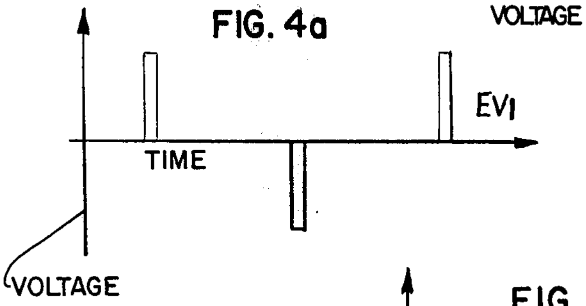
FIGS. 4*a, b,* and *c* are representations of the shapes of the output pulses of FIGS. 3*a, c* and *d*, respectively, amplified and obtained at the output of a "push-pull" type transformer at the output of the electrical circuit.
Figure 4B:
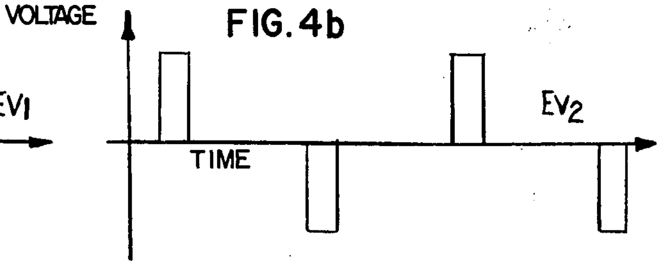
Figure 4C:
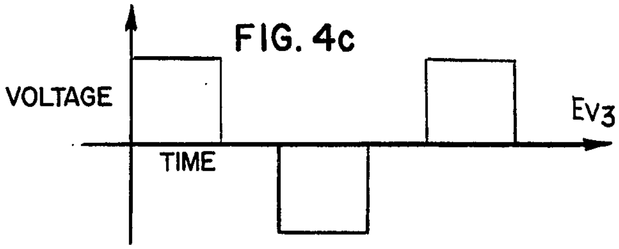

Using two differential comparators 45, 47 and with exponential waves applied to each one of them with a 180° waves difference, there are obtained two trains of rectangular impulses, one from each comparator of the same sign, equal width, and with a phase difference of 180° between them for a given video signal. The impulse trains are amplified by transistors 7, 8, 9 and 10, arranged in a "push-pull" type configuration and therefrom applied to the primary 49 of an output transformer, so as to obtain in the secondary (not shown) an alternating voltage, as indicated in FIGS. 4*a*, *b*, and *c*.

Figure 1:
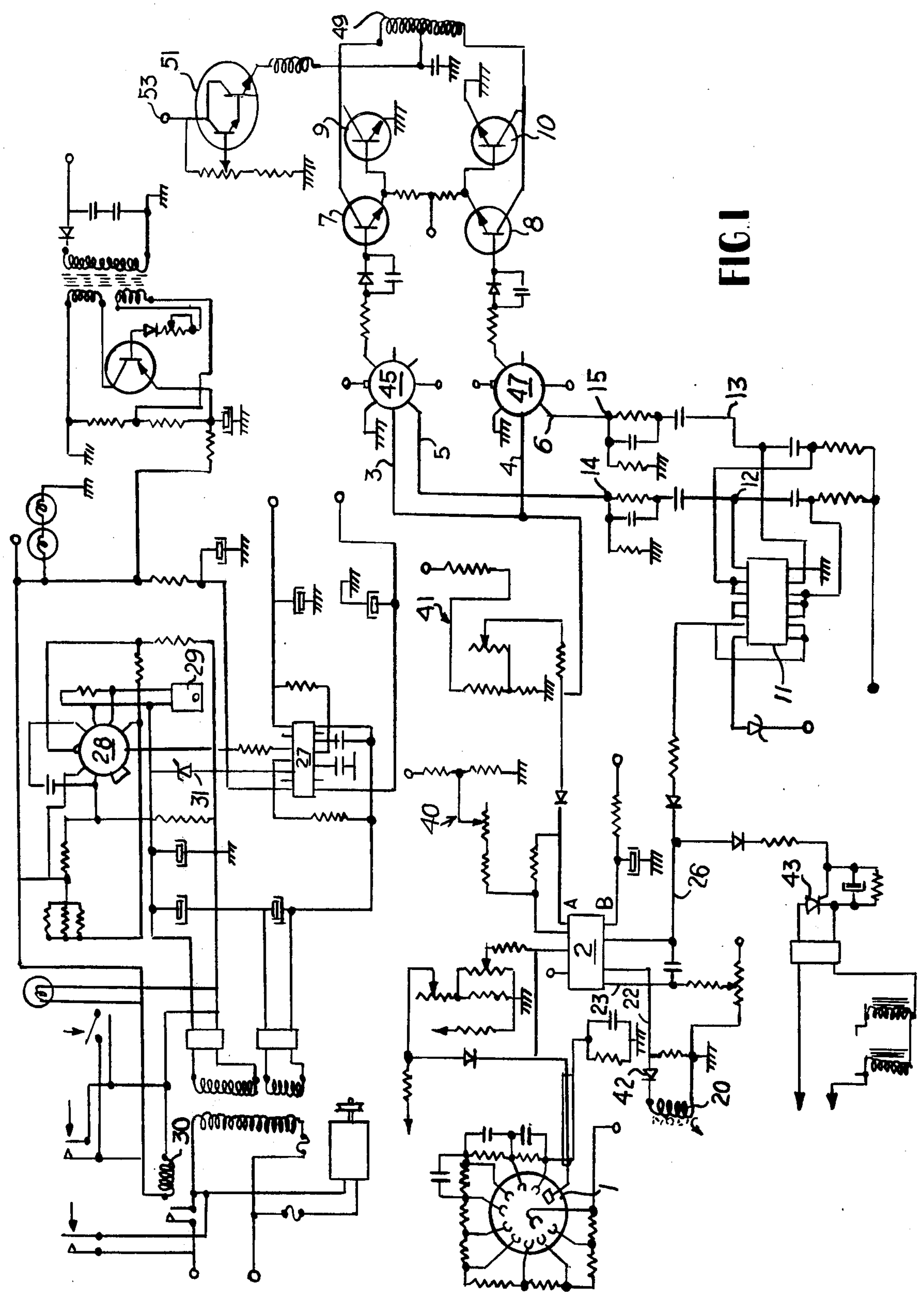
FIG. 1 is a schematic view of the complete electrical circuit of the engraving device which constitutes the object of the invention.
Figure 5:
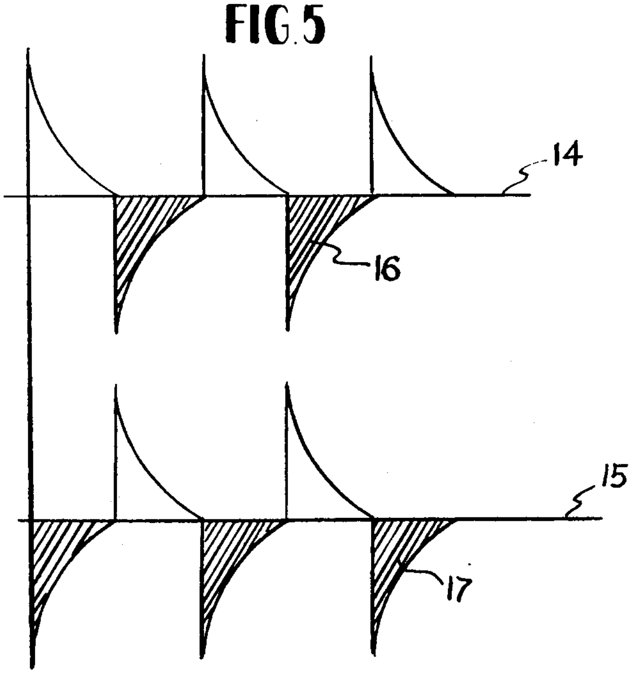
FIG. 5 is a represention of the trains of alternating exponential impulses obtained from an integrated circuit which works as multivibrator oscillator, from which there are extracted two signals of square waves, which passing through an equalizer with resistors and capacitors, take on the form represented.

The alternating exponential impulses are . btained from an integrated circuit 11, which functions as a multivibrator oscillator, from which there are taken two signals of square waves at 12 and 13, which, after passing through an equalizer composed of resistors and capacitors 14, 15, assume the form represented in FIG. 5.

Those are applied to the reversing inputs of the respective differential comparators. Only the negative half cycles 16 and 17 (see FIG. 5) are used, the positive ones being ignored. Accordingly, the more illuminated zones of the original (light tones) which produce a negative signal at the output of the phototube is simultaneously applied to the two inputs which are not reversing, i.e. 3 and 4 of the two comparators, producing at the output thereof rectangular impulses of short duration. As the phototube scans zones which are darker, the voltage comes closer to zero and the impulses increase in width more rapidly the closer to the level zero, which represents black. In this manner, there is produced the correct relationship between the light detected on the original and the energy applied to the engraving wire, to obtain as a result a high quality image.

Regulation of the voltage output at the transformer secondary is accomplished through the use of the "Darlington" connected transistor 51 coupled to the transformer primary 49. The transistor which is employed as a voltage follower regulates the d.c. voltage applied at point 53 to in turn adjust the high voltage output applied to the transformer primary 49.

Control of contrast and tone are accomplished through connection 2A of amplifier 2, which controls amplification of the video signal. The contrast is varied by changing the feedback of the amplifier through network 40. That is obtained by cancelling part of the feedback signal 13. The signal is not given the potential of the source bzt a slightly negative value, so that when the contrast is changed, there is no change in the mean tone level. The tone is controlled by network 41.

Figure 6:
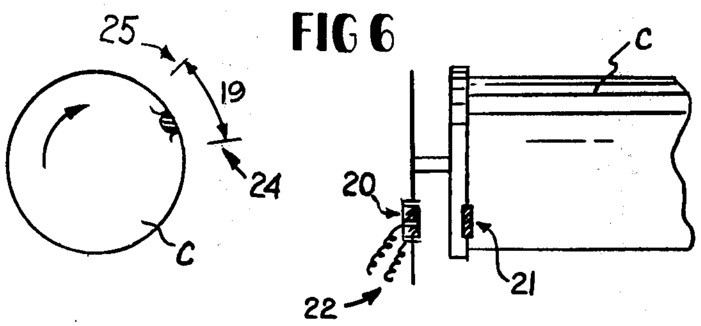
FIG. 6 is a diagrammatical view of the integrating cylinder of the stencil engraving machine which includes means for cutting off stylus signals at the stencil clamp and produces a start signal once the proper rotational velocity of the cylinder has been reached.

With unit 19 (see FIG. 6) there is established a minimum negative level of signal below which a diode 42 disconnects the operational amplifier 2, limiting the voltage applied to the differential comparators to a value such that the rectangular output impulses do not exceed 180°. In that circuit, there are also included the current-cutting signals to prevent burning (output) signals from being produced when the stylus passes over the connecting junction or stencil clamp of the cylinder *c*, and the copying indicating device to actuate the circuit to produce output signals once the cylinder has acquired a predetermined velocity. It includes a fixed coil 20, into which a voltage is induced at each rotation of cylinder *c*, under the influence of a magnet 21, which rotates with the cylinder (see FIG. 6).

As the rotational velocity of the cylinder increases, there also increases the amplitude of the induced signal 22. The latter is applied to the input 2B of the operational amplifier 2, together with a reference voltage at point 23 which is adjusted at a value such that it equals the impulse 22 at the predetermined velocity of the cylinder (see FIG. 6). This produces a train of impulses, synchronized with the rotation of the cylinder, which start when the cylinder rotates at the correct velocity. The magnet is placed in cylinder *c*, in a position such that the front part of the impulse begins at 24, and with capacitor connected at point 23 there is obtained a time delay in the change of state of the amplifier 2, which ends at point 25 (See Fig. 6). The signal on 26, is used to cut off the oscillation of the multivibrator 11, and also to operate an "SCR" 43 which governs the movement of the stylus onto the sensitive material and also the start of the translational motion of the carriage (not shown), upon which the stylus is mounted.

The circuit includes the following dispositions as protection against overloads: In the lower power voltage regulator network, operational amplifier 27 controls the current to prevent overheating.

In the power voltage regulator 28 there is added a maximum current limiting device. Past that point, the voltage falls, and so does the current, to keep the dissipation of transistor 29 low.

The ignition developer relay coil or circuit breaker 30 is connected to the *fp* system in a manner such that if an overload exceeds a predetermined value, the whole circuit becomes disconnected.

And finally, the protection against line (network) irregularities, by means of zener 31, for short duration, and combined with fuse 32 for high energy irregularities.

Figure 2:
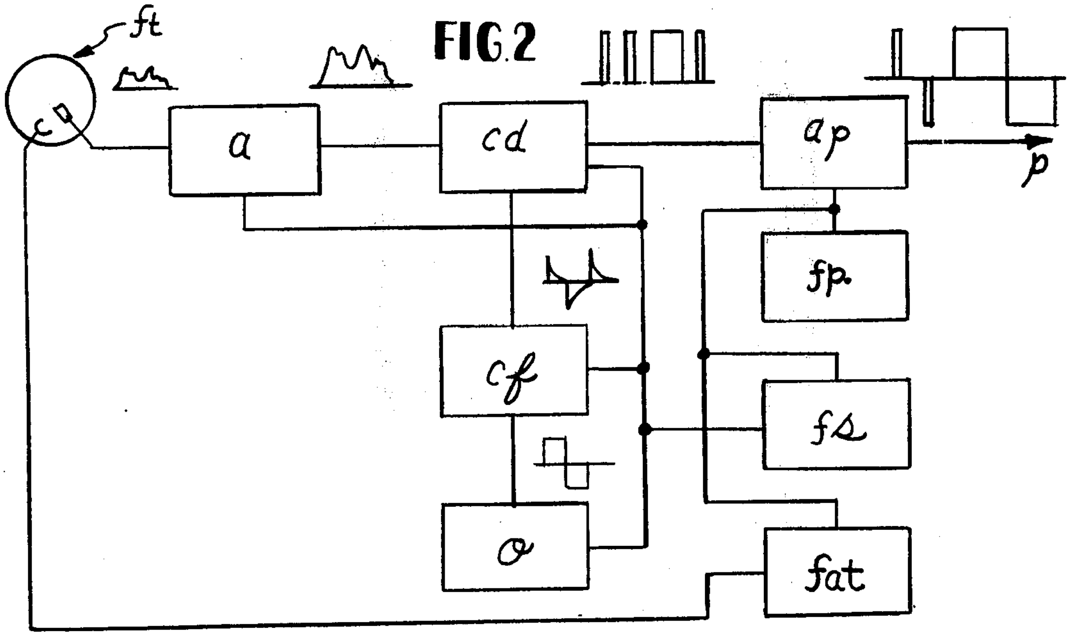
FIG. 2 is a block diagram view of the electrical circuit according to the invention.

In the block diagram in FIG. 2, there has been illustrated the phototube *ft*, the amplifier 2, the differential comparators i dc, the wave former *cf*, the oscillator *o*, the power amplifier *ap*, the main source *fp*, the secondary source *fs*, and the high voltage source fat, there being placed on the side corresponding wave shape, toward the output at the engraving wire *p*.

There must only be added here that when the circuit is executed in practice, there can be introduced into it modifications, without departing the basic principles which have been described and summarized in the following claims.

What I claim is:

1. Apparatus for electrically burning information from an original document into a stencil material having non-linear burning characteristics including a stylus for applying electrical pulses for burning said material and an electrical circuit coupled to said stylus for providing said electrical pulses thereto, said circuit comprising:

optical sensor means for scanning the information on said original document and providing an output signal, the amplitude of which is proportional to the shade of said information being scanned, circuit means for providing a train of pulses having a predetermined shape which is selected to conform to the non-linear characteristics of the stencil material, said circuit means comprising wave signal generating means and circuitry coupled thereto for shaping the output signal of said generating means to provide a train of non-linearly varying wave pulses and means coupled to said optical sensor means, said circuit means and said stylus means for comparing the output signal provided by said sensor means and the pulses provided by said circuit means, said comparing means providing output pulses having widths representing the intervals of time when the amplitude of the output signal of said optical sensor means is greater than the amplitude of the non-linearly varying wave pulses for application to said stylus for use in burning said stencil material, the width of said output pulses incresing non-linearly as the shade of the information scanned by said optical sensor means becomes darker.

2. Apparatus as claimed in claim 1 further including an output transformer having a primary and secondary winding, said primary winding being coupled to said electrical circuit and said secondary winding being coupled to said stylus, and means for controlling the voltage level of the output pulses at said stylus, coupled to said primary winding, said means including voltage follower means connected to a source of direct current and variable resistance means coupled to said voltage follower means for controlling the d.c. voltage therethrough.

3. Apparatus as claimed in claim 2 wherein said voltage follower means includes a transistor connected in an emitter follower configuration.

4. Apparatus as claimed in claim 1 wherein the circuit means provides two trains of output pulses of like polarity, 180° out of phase, wherein said pulse comparing means includes first and second circuits, each of which receives one of said trains of output pulses from said circuit means and wherein said electrical circuit further includes amplifier means interposed between said first and second pulse comparing circuits and said stylus, said amplifier means converting said pulses into a single train of pulses having positive and negative polarity.

5. Apparatus as claimed in claim 1 wherein said wave signal and generating means includes a square wave oscillator.

6. Apparatus as claimed in claim 5 wherein the pulse combining means includes means for adding the output signal of said optical sensor means and the output pulses of said curcuit means to provide said stencil burning output pulses.

7. Apparatus as claimed in claim 1 further including first amplifier means for amplifying the output of said optical sensor means and second amplifier means for amplifying the output signals from said pulse comparing means prior to application to said stylus, said second amplifying means providing positive and negative going pulses to said stylus.

8. Apparatus as claimed in claim 1 wherein said apparatus further includes a rotatable cylinder upon which said stencil material is mounted with the ends of said material forming a junction along a line parallel with the axis of rotation of said cylinder and wherein said electrical circuit further includes means actuated in accordance with the rotation of the cylinder to discontinue application of the output pulses to said stylus when the latter crosses said junction.

9. Apparatus as claimed in claim 8 wherein said output pulse discontinuation means includes first means mounted on said cylinder and revolving therewith as the cylinder is rotated and fixed sensing means coupled to said electronic circuit for sensing said first means as the latter is revolved.

10. Apparatus as claimed in claim 9 wherein the first means includes a magnetic member and wherein said fixed sensing means includes a coil in which pulses are induced by the passage of said member on said cylinder said coil being coupled to said electrical circuit means whereby in response to the induction of pulses in said coil said electrical circuit means discontinues the application of output pulses to said stylus.

* * * * *

UNITED STATES PATENT OFFICE
CERTIFICATE OF CORRECTION

Patent No. 4,021,605 Dated May 3, 1977

Inventor(s) Julio G. Tauszig Page 1 of 2

It is certified that error appears in the above-identified patent and that said Letters Patent are hereby corrected as shown below:

Column 2, line 27 should read:

"of the output pulses of FIGS. 3b, c and d, respectively,"

Column 3, line 23 should read:

"180° phase difference, there are obtained two trains of"

Column 3, line 32 should read:

" The alternating exponential impulses are obtained"

Column 4, line 1 should read:

"of the source but a slightly negative value, so that when"

Column 4, line 58 should read:

"comparators dc, the wave former cf, the oscillator o,"

UNITED STATES PATENT OFFICE
CERTIFICATE OF CORRECTION

Patent No. 4,021,605 Dated May 3, 1977

Inventor(s) Julio G. Tauszig

It is certified that error appears in the above-identified patent and that said Letters Patent are hereby corrected as shown below:

Column 5, line 30 should read:

"increasing non-linearly as the shade of the informa-"

Signed and Sealed this

*ninth* Day of *August 1977*

[SEAL]

*Attest:*

RUTH C. MASON
*Attesting Officer*

C. MARSHALL DANN
*Commissioner of Patents and Trademarks*